US008457644B2

(12) United States Patent
Schmidt et al.

(10) Patent No.: US 8,457,644 B2
(45) Date of Patent: Jun. 4, 2013

(54) SYSTEM AND METHOD FOR PLANNING A WIRELESS NETWORK

(75) Inventors: Jeffrey C. Schmidt, Orlando, FL (US); Michelle C. Palmer, Altamonte Springs, FL (US); Joseph M. Hamilla, Sanford, FL (US)

(73) Assignee: Spectrum Bridge Inc., Lake Mary, FL (US)

( * ) Notice: Subject to any disclaimer, the term of this patent is extended or adjusted under 35 U.S.C. 154(b) by 1013 days.

(21) Appl. No.: 12/204,529

(22) Filed: Sep. 4, 2008

(65) Prior Publication Data

US 2010/0056163 A1 Mar. 4, 2010

(51) Int. Cl.
*H04W 4/00* (2009.01)

(52) U.S. Cl.
USPC ......... 455/446; 455/450; 455/422.1; 455/449

(58) Field of Classification Search
USPC ................. 455/446, 449, 422.1, 424, 450
See application file for complete search history.

(56) References Cited

U.S. PATENT DOCUMENTS

| | | | | | |
|---|---|---|---|---|---|
| 5,752,164 | A | * | 5/1998 | Jones | 455/454 |
| 7,142,868 | B1 | * | 11/2006 | Broyles et al. | 455/453 |
| 7,257,107 | B2 | * | 8/2007 | Swier et al. | 370/338 |
| 7,634,265 | B2 | * | 12/2009 | Sugahara et al. | 455/423 |
| 7,787,863 | B2 | * | 8/2010 | van de Groenendaal | 455/411 |
| 7,933,605 | B2 | * | 4/2011 | Rappaport et al. | 455/446 |
| 2001/0051503 | A1 | * | 12/2001 | Lush | 455/2.01 |
| 2004/0038683 | A1 | * | 2/2004 | Rappaport et al. | 455/446 |
| 2004/0077366 | A1 | * | 4/2004 | Panasik et al. | 455/514 |
| 2004/0132457 | A1 | * | 7/2004 | Sanders et al. | 455/450 |
| 2004/0235484 | A1 | * | 11/2004 | Korpela et al. | 455/446 |
| 2004/0236547 | A1 | * | 11/2004 | Rappaport et al. | 703/2 |
| 2004/0259555 | A1 | * | 12/2004 | Rappaport et al. | 455/446 |
| 2005/0233751 | A1 | * | 10/2005 | Bardwell | 455/446 |
| 2006/0083205 | A1 | * | 4/2006 | Buddhikot et al. | 370/338 |
| 2006/0143111 | A1 | * | 6/2006 | Mylet | 705/37 |
| 2006/0173619 | A1 | * | 8/2006 | Brant et al. | 701/213 |
| 2006/0276195 | A1 | * | 12/2006 | Nordling | 455/446 |
| 2006/0286934 | A1 | * | 12/2006 | Kuffner et al. | 455/63.1 |
| 2007/0054670 | A1 | * | 3/2007 | Kalika et al. | 455/446 |
| 2007/0225007 | A1 | * | 9/2007 | Unkefer et al. | 455/450 |
| 2007/0225008 | A1 | * | 9/2007 | Unkefer et al. | 455/450 |
| 2007/0225009 | A1 | * | 9/2007 | Unkefer et al. | 455/450 |
| 2008/0070580 | A1 | * | 3/2008 | Menich et al. | 455/446 |
| 2008/0207149 | A1 | * | 8/2008 | Unkefer et al. | 455/115.3 |
| 2008/0222021 | A1 | * | 9/2008 | Stanforth et al. | 705/37 |
| 2008/0298275 | A1 | * | 12/2008 | De Sousa | 370/255 |
| 2008/0318583 | A1 | * | 12/2008 | Guill, Jr. | 455/446 |
| 2012/0238218 | A1 | * | 9/2012 | Stine | 455/67.11 |

* cited by examiner

*Primary Examiner* — Kamran Afshar
*Assistant Examiner* — Mong-Thuy Tran
(74) *Attorney, Agent, or Firm* — Renner, Otto, Boisselle & Sklar, LLP

(57) ABSTRACT

Systems and methods for planning a wireless network are disclosed. Attributes of the wireless network may be determined from minimal information. For instance, based on a specified coverage area and network usage information, and without operating frequency information, base station equipment models may be determined. An estimated number of base stations to deploy the network also may be determined. Also, a geographic extent of the network for regulatory compliance and acquisition of spectrum use rights may be determined.

28 Claims, 5 Drawing Sheets

| Channel BW (MHz) | | 1.75 | | | |
|---|---|---|---|---|---|
| Mode (FDD/TDD3:1) | | TDD DL | TDD UL | FDD | Efficiency |
| BPSK | 1/2 | 473 | 163 | 699.6 | 0.399771 |
| QPSK | 1/2 | 941 | 326.5 | 1394.25 | 0.796714 |
| QPSK | 3/4 | 1411 | 489.5 | 2090.55 | 1.1946 |
| 16-QAM | 1/2 | 1881.5 | 653 | 2787.95 | 1.593114 |
| 16-QAM | 3/4 | 2822.5 | 979 | 4181.65 | 2.389514 |
| 64-QAM | 2/3 | 3763 | 1305.5 | 5575.35 | 3.185914 |
| 64-QAM | 3/4 | 4233.5 | 1469 | 6272.75 | 3.584429 |

| Channel BW (MHz) | | 3.50 | | | |
|---|---|---|---|---|---|
| Mode (FDD/TDD3:1) | | TDD DL | TDD UL | FDD | Efficiency |
| BPSK | 1/2 | 946 | 326 | 1399.2 | 0.399771 |
| QPSK | 1/2 | 1882 | 653 | 2788.5 | 0.796714 |
| QPSK | 3/4 | 2822 | 979 | 4181.1 | 1.1946 |
| 16-QAM | 1/2 | 3763 | 1306 | 5575.9 | 1.593114 |
| 16-QAM | 3/4 | 5645 | 1958 | 8363.3 | 2.389514 |
| 64-QAM | 2/3 | 7526 | 2611 | 11150.7 | 3.185914 |
| 64-QAM | 3/4 | 8467 | 2938 | 12545.5 | 3.584429 |

| Channel BW (MHz) | | 5.00 | | | |
|---|---|---|---|---|---|
| Mode (FDD/TDD3:1) | | TDD DL | TDD UL | FDD | Efficiency |
| BPSK | 1/2 | | | | |
| QPSK | 1/2 | 2520 | 653 | 3490.3 | 0.69806 |
| QPSK | 3/4 | 3780 | 979 | 5234.9 | 1.04698 |
| 16-QAM | 1/2 | 5040 | 1306 | 6980.6 | 1.39612 |
| 16-QAM | 3/4 | 7560 | 1958 | 10469.8 | 2.09396 |
| 64-QAM | 2/3 | 10080 | 2611 | 13960.1 | 2.79202 |
| 64-QAM | 3/4 | 11340 | 2938 | 15705.8 | 3.14116 |

| Channel BW (MHz) | | 10.00 | | | |
|---|---|---|---|---|---|
| Mode (FDD/TDD3:1) | | TDD DL | TDD UL | FDD | Efficiency |
| BPSK | 1/2 | | | | |
| QPSK | 1/2 | 5040 | 1344 | 7022.4 | 0.70224 |
| QPSK | 3/4 | 7560 | 2016 | 10533.6 | 1.05336 |
| 16-QAM | 1/2 | 10800 | 2688 | 14836.8 | 1.48368 |
| 16-QAM | 3/4 | 15120 | 4032 | 21067.2 | 2.10672 |
| 64-QAM | 2/3 | 20160 | 5376 | 28089.6 | 2.80896 |
| 64-QAM | 3/4 | 22680 | 6048 | 31600.8 | 3.16008 |

| Channel BW (MHz) | | 20.00 | | | |
|---|---|---|---|---|---|
| Mode (FDD/TDD3:1) | | TDD DL | TDD UL | FDD | Efficiency |
| BPSK | 1/2 | | | | |
| QPSK | 1/2 | 10080 | 2688 | 14044.8 | 0.70224 |
| QPSK | 3/4 | 15120 | 4032 | 21067.2 | 1.05336 |
| 16-QAM | 1/2 | 21600 | 5376 | 29673.6 | 1.48368 |
| 16-QAM | 3/4 | 30240 | 8064 | 42134.4 | 2.10672 |
| 64-QAM | 2/3 | 40320 | 10752 | 56179.2 | 2.80896 |
| 64-QAM | 3/4 | 45360 | 12096 | 63201.6 | 3.16008 |

FIG. 4

| Usable Range per 802.11g Data Rate at 2400 MHz, 36 dBm EIRP, N = 2.4 | | |
| --- | --- | --- |
| WiMAX Data Rate | eff range (km) | eff range (mi) |
| 64-QAM 54 mbps | 0.21 | 0.13 |
| 64-QAM 48 mbps | 0.23 | 0.14 |
| 16-QAM 36 mbps | 0.34 | 0.21 |
| 16-QAM 24 mbps | 0.50 | 0.30 |
| QPSK 18 mbps | 0.67 | 0.41 |
| QPSK 12 mbps | 0.81 | 0.49 |
| BPSK 9 mbps | 0.98 | 0.60 |
| BPSK 6 mbps | 1.08 | 0.66 |

| Usable Range per 802.11a Data Rate at 5800 MHz, 36 dBm EIRP, N = 2.4 | | |
| --- | --- | --- |
| WiMAX Data Rate | eff range (km) | eff range (mi) |
| 64-QAM 54 mbps | 0.09 | 0.05 |
| 64-QAM 48 mbps | 0.10 | 0.06 |
| 16-QAM 36 mbps | 0.13 | 0.09 |
| 16-QAM 24 mbps | 0.21 | 0.13 |
| QPSK 18 mbps | 0.28 | 0.17 |
| QPSK 12 mbps | 0.33 | 0.20 |
| BPSK 9 mbps | 0.40 | 0.25 |
| BPSK 6 mbps | 0.45 | 0.27 |

| Usable Range per 802.11b Data Rate at 2400 MHz, 36 dBm EIRP, N = 2.4 | | |
| --- | --- | --- |
| WiMAX Data Rate | eff range (km) | eff range (mi) |
| 11 mbps CCK | 0.95 | 0.52 |
| 5.5 mbps CCK | 1.03 | 0.63 |
| 2 mbps CCK | 1.25 | 0.76 |
| 1 mbps CCK | 1.52 | 0.93 |

FIG. 5

SYSTEM AND METHOD FOR PLANNING A WIRELESS NETWORK

TECHNICAL FIELD OF THE INVENTION

The technology of the present disclosure relates generally to wireless communications infrastructure and, more particularly, to a system and method for aiding a wireless network designer to plan wireless network.

BACKGROUND

Wireless networks and systems are becoming increasingly popular. But designing a wireless network is a difficult task, even for experienced network designers. For persons with little knowledge regarding how to select specific wireless network equipment and identifying spectrum needs (e.g., the geographic boundaries of spectrum to support the desired network application), the task of building a network can be a daunting challenge. In addition, as spectrum becomes more scarce and its use become more congested, the task of effectively partitioning spectrum among geographic areas becomes more difficult.

SUMMARY

To facilitate the design of a wireless network and the acquisition of supporting spectrum use rights, the present disclosure describes systems and methods for aiding a wireless network designer plan wireless network characteristics and evaluate different network options. The systems and method are implemented to allow network designers to plan and evaluate spectrum needs where there may be one or more co-located networks so that the potential for interference is minimized. Also, the systems and methods may aid in the coordination of disaggregating existing spectrum use rights so that a portion of an existing spectrum use right may be allocated to a propose network. In so doing, the determination of a geographic size of a proposed network is made in a manner to constrain the geographic size so that spectrum may be allocated in an efficient manner.

According to one aspect of the disclosure, a first computer implemented method of identifying equipment for a proposed wireless network includes receiving wireless network criteria from a network developer, the wireless network criteria identifying a geographic coverage area with respect to a map and identifying projected usage information for determining network throughput; identifying one or more base station equipment models that are capable of implementing the wireless network criteria from a database of wireless network equipment that contains data for base stations available from plural equipment manufacturers, wherein the identification of base station models is made without specification of network operating frequency by the network developer; and for each identified base station equipment model, identifying an estimated number of base stations to satisfy the wireless network criteria.

According to one embodiment, the first method further includes, for at least one of the base station equipment models, identifying a geographic extent for the proposed wireless network, the geographic extent sized to comply with regulatory signal strength limits.

According to one embodiment of the first method, the geographic extent defines geographic data that is used to generate spectrum identifying components of a request for spectrum use rights from a spectrum exchange through which spectrum to support the proposed wireless network is acquired.

According to one embodiment of the first method, the geographic extent is the geographic coverage area combined with a buffer area, the buffer area defined by circumscribing the geographic coverage area by a distance extending outward from all points of a perimeter of the geographic coverage area.

According to one embodiment of the first method, a manner in which the distance is determined is based on whether the base stations of the proposed wireless network will be deployed inside or outside one or more buildings.

According to one embodiment of the first method, the distance is determined using a path loss model.

According to one embodiment of the first method, the geographic extent is a boundary that is established around and encompassing a compliance contour for each base station.

According to one embodiment, the first method further includes, for at least one of the base station equipment models, determining an arrangement of base station locations to satisfy the wireless network criteria.

According to one embodiment, the first method further includes displaying the map and base station locations relative to the coverage area.

According to one embodiment, the first method further includes displaying the map and at least one of a compliance contour or a data rate contour for each base station.

According to one embodiment, the first method further includes outputting each identified base station equipment model and estimated number of base stations to the network developer in a format for evaluation of network feasibility and cost in terms of estimated capital expenditure and operating expenditure for each identified base station equipment model.

According to another aspect of the disclosure, a second computer implemented method of constraining a geographic size of a proposed wireless network includes receiving wireless network criteria from a network developer, the wireless network criteria identifying a geographic coverage area with respect to a map and identifying projected usage information for determining network throughput; identifying an estimated number of base stations to satisfy the wireless network criteria; and identifying a geographic extent for the proposed wireless network, the geographic extent sized to comply with regulatory signal strength limits.

According to one embodiment of the second method, the identification of the estimated number of base stations is made without specification of network operating frequency by the network developer.

According to one embodiment of the second method, the geographic extent defines geographic data that is used to generate spectrum identifying components of a request for spectrum use rights from a spectrum exchange through which spectrum to support the proposed wireless network is acquired.

According to one embodiment of the second method, the geographic extent is the geographic coverage area combined with a buffer area, the buffer area defined by circumscribing the geographic coverage area by a distance extending outward from all points of a perimeter of the geographic coverage area.

According to one embodiment of the second method, a manner in which the distance is determined is based on whether the base stations of the proposed wireless network will be deployed inside or outside one or more buildings.

According to one embodiment of the second method, the distance is determined using a path loss model.

According to one embodiment of the second method, the geographic extent is a boundary that is established around and encompassing a compliance contour for each base station.

According to one embodiment, the second method further includes determining an arrangement of base station locations to satisfy the wireless network criteria.

According to one embodiment, the second method further includes displaying the map and base station locations relative to the coverage area.

According to one embodiment, the second method further includes displaying the map and at least one of a compliance contour or a data rate contour for each base station.

According to one embodiment, the second method further includes redetermining the geographic extent in response to rearrangement of the base station locations by the network developer.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 4 is an exemplary look-up table for use by the system of FIG. 1;

FIG. 5 is another exemplary look-up table for use by the system of FIG. 1.

DETAILED DESCRIPTION OF EMBODIMENTS

Figures 1, 2:
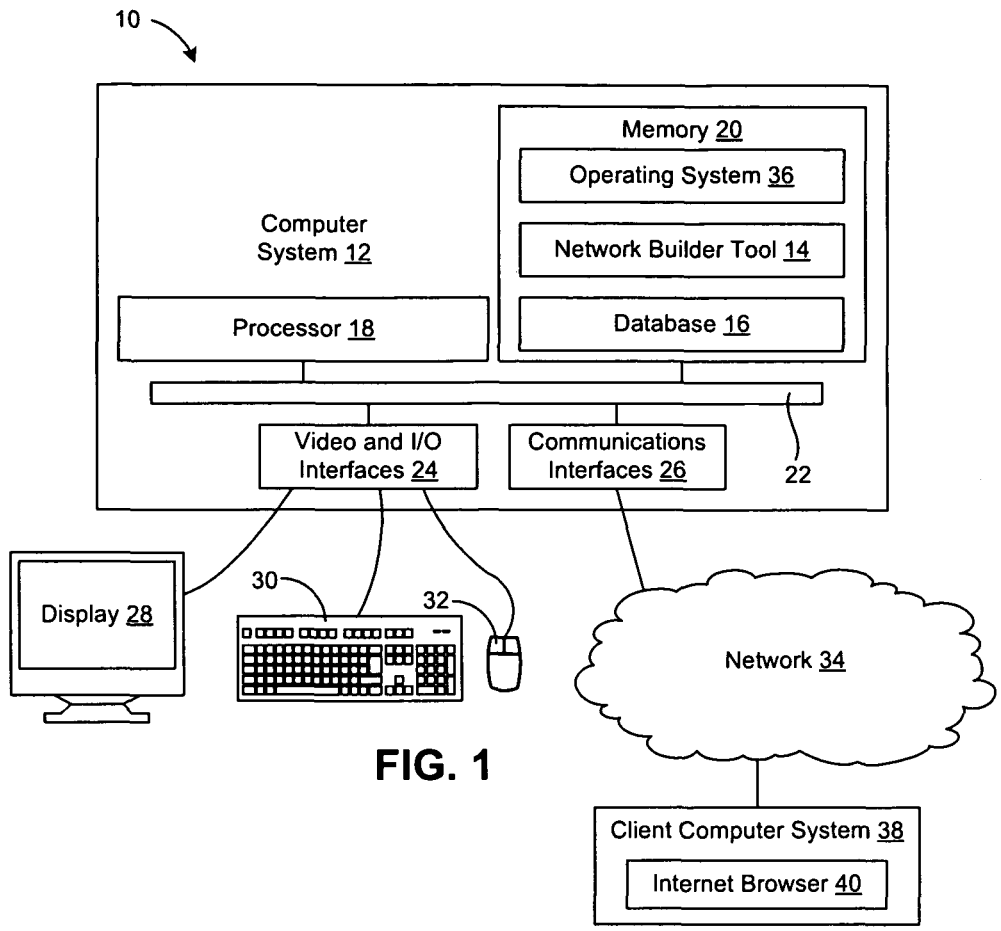
FIG. 1 is a schematic view of an exemplary system for planning a wireless network.
FIG. 2 is a flow chart representing an exemplary method of planning a wireless network.

Embodiments will now be described with reference to the drawings, wherein like reference numerals are used to refer to like elements throughout. It will be understood that the figures are not necessarily to scale.

A. Overview

A(1). Parties

In this document, described are various entities that may have a relationship to electromagnetic spectrum for use in wireless communications. One entity is a spectrum holder, or simply a holder. A holder is any entity having the authority to release spectrum use to another entity by granting the other entity access to the spectrum. The granting of access may be a temporary permission to use spectrum that is associated with the holder. Therefore, the access grant need not be a lease or a sub-lease, as defined by the FCC. The holder may be, but is not limited to, a government or regulatory agency (e.g., in the United States, the FCC), a Commission licensee (e.g., in the United States, an entity that has licensed spectrum directly from the FCC in the primary spectrum market), or a secondary market licensee.

Another entity is a spectrum user, or simply a user. A spectrum user is any entity or wireless communications system that has a need for spectrum in order to carry out wireless communications. The spectrum user also may be a holder. In this document, a network developer may be or may not be associated with a spectrum user. Also, a spectrum user may be distinguishable from a human operator of a computer-based system. Such a human operator also referred to as a "user," but the context of use will suffice to differentiate a spectrum user from a computer system user.

Another entity is a spectrum broker. A spectrum broker is any entity that hosts an automated spectrum exchange that matches available spectrum from holders to spectrum needs of users. Use rights for the matched spectrum may then be transferred from the holder to the user under specified parameters, such as time duration, geography, transmission power, spectral mask, etc. Additional description of such an exchange of spectrum is described in U.S. patent application Ser. No. 12/042,543, filed Mar. 5, 2008, the disclosure of which is incorporated herein by reference in its entirety.

The spectrum broker may be a holder, a user or a third party. In some instances, the term broker may be used to refer to a device or system that hosts a spectrum exchange function and is not to be confused with an entity that owns or operates the corresponding device or system.

A(2). Exemplary Wireless Context

Aspects of the disclosed systems and methods will be described in the exemplary context of planning a WiMAX network, such as a network configured to comply with IEEE standard 802.16d or IEEE standard 802.16e. It will be appreciated that the techniques may be applied to the planning of a network other than WiMAX. Another exemplary type of network is a cellular network based on global system for mobile communications (GSM), code division multiple access (CDMA), wideband CDMA (WCDMA), general packet radio service (GPRS), or an advanced versions of one of these standards or another standard. Another exemplary type of network is a WiFi network compliant with one of the IEEE 802.11 standards (e.g., 802.11a, 802.11b, 802.11g, or 802.11n). Also, the planning techniques may be applied to general purpose radio networks, such as trunked radio or paging systems.

Therefore, the type or types of radio devices that will form part of the network is not germane to the underlying systems and methods. Also, various calculations, look-up tables, equipment database entries and so forth may be modified for the various particularities of the network type of interest. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

A(3). General Considerations

This disclosure describes techniques that allow a network developer to identify and evaluate equipment that may be used in a network, identify the topology of network base stations, and identify a geographic boundary that identifies a geographic extent of spectrum that may be used to operate the network. As such, the systems and methods allow a network developer to determine network feasibility, and to estimate infrastructure components (e.g., equipment and/or spectrum) and cost for a proposed wireless network. From the information generated by the systems and methods, a feasibility analysis of deploying the network may be made and planning for deploying the network may be made, including seeking access permission to spectrum that will support the proposed network.

The term base station will be used to refer to a radio assembly that services client devices. Therefore, depending on the network, a base station may be a cellular radio tower, a WiFi access point, a WiMAX access point, etc.

As will become more apparent, the skill and/or experience level the network developer may be fairly low when using the disclosed systems and/or methods to plan a network. This is because automated tools may be used to identify and output network equipment options. Also, a base station topology and/or a geographic spectrum boundary for one or more of the network equipment options may be generated using the automated tools. Of course, highly skilled and/or experienced network developers also may use the disclosed systems and/or methods to plan a network.

Furthermore, an analysis of the capital expenses and/or the operating expenses for the identified equipment options may be made. The analysis may assist the network developer efficiently perform cost analysis for deploying a network option and then subsequently operating the network option, including considering expenses involved in maintaining use rights over spectrum to operate the network. For instance, the geographic boundary may be used to assist in defining spectrum parameters that may be used to acquire spectrum. Spectrum may be acquired in a number of ways, such as using spectrum for which the network developer already has use rights, acquiring a primary spectrum license from the Federal Communications Commission (FCC) or other regulatory body if outside the United States (U.S.), obtaining an FCC sublease for spectrum from a primary license holder, or acquiring spectrum through a spectrum exchange that is hosted by a spectrum broker.

If acquired from an exchange, each segment of spectrum for which access permission may be transferred may be identified by several components and each component is defined by one or more variables. Exemplary components include a time window, a frequency-based spectral mask, a geography-based emission mask and a transmitted power limit. The geographic boundary that is generated by the below-described systems and methods may be used in the generation of any or all of these spectrum-identifying components.

The time window may be a period of time that has a starting point given by a day and time and an ending point given by a day and time. Alternatively, the time window may be a period of time specified by a starting time and a duration. The time window may be as short as a second and as long as years.

The frequency-based spectral mask, as is known in the art, may be a mathematically defined set of lines applied to levels of radio transmission. The frequency-based spectral mask is generally intended to reduce interference by limiting excessive radiation at frequencies outside a certain bandwidth. Spectral masks often include a center frequency and/or a frequency range. Also, spectral masks often include an absolute power component or a relative power component. For an absolute power component, the frequency-based spectral mask may specify that transmission beyond a specified frequency range must be below a specified power value. For a relative power component, the frequency-based spectral mask may specify that transmission beyond a specified frequency range must be below a relative power value as determined by a function, such as a specified power value below the total amount of power being transmitted.

The geography-based emission mask may include a defined geographical boundary that radios operating in accordance with the emission mask may not appreciably transmit beyond. The geographical boundary specified by the geography-based emission mask may be a complex construct that relates to a contiguous or non-contiguous area. The amount of permissible transmission beyond the geographical boundary may be determined in an absolute manner or a relative manner. For an absolute manner, the geography-based emission mask may specify that transmission beyond the boundary must be below a specified power value. For a relative manner, the geography-based emission mask may specify that transmission beyond the boundary must be below a relative power value as determined by a function, such as a specified power value below the total amount of power being transmitted. In one embodiment, the function used for calculating the relative power value may include a distance parameter so that the relative power value may be calculated as a function of distance away from the boundary or other geographical reference.

The geography-based emission mask, alone or in combination with the time window, the frequency-based spectral mask and the transmitted power limit, may be established to control an amount of interference that a user system generates with respect to continued operations of the spectrum holder and/or other users.

The transmitted power limit may be a power value that radios operating in accordance with the transmitted power limit may not exceed. The transmitted power limit may be absolute or relative. The transmitted power limit may be independent of the frequency-based spectral mask and/or the geography-based emission mask. The transmitted power limit may be expressed as an average power value (e.g., average total power), a peak power value, or similar value. Exemplary transmitted power limits are 500 milliwatts (mW), one watt (W), 1,000 watts, etc.

Factors that contribute to the generation of the geographic boundary for the network include coverage area of the network for servicing client devices, electromagnetic wave propagation, performance, regulatory requirements, interference mitigation and availability. If defined efficiently, the geographic boundary may support the network developer's desired operational requirements, maximize radio efficiency, minimize the size of a buffer zone around a desired service area for the network, and minimize the possibility of contention or interference between users in adjacent geographic areas. The disclosed systems and methods employ predictive and analytical techniques for establishing performance/signal contours to establish the geographic boundary.

To these ends, several terms will be defined. The "licensed spectrum" refers to frequency band(s) allocated by the FCC or other regulatory authority to specific licensees (e.g., holders) for use in a specific location, for a specified period of time and for a specific purpose.

The term "signal strength contour" refers to a closed boundary that represents an specific level of performance in terms of signal strength (e.g., a predetermined electric field value or a predetermined radio signal strength value). This signal strength may be constant with respect to a radio transmitter or plurality of radio transmitters. Any area that lies between the signal strength contour and its respective transmitter(s) is assumed to have signal strength equal to or greater than the associated electric field value or radio signal strength value.

The term "performance contour" refers to a closed boundary that represents a specific level of projected performance in terms of data rate (e.g. a predetermined data rate value). Therefore, the performance contour may be thought of as a data rate contour established with respect to a radio transmitter or plurality of radio transmitters. Any area that lies between the data rate contour and its respective transmitter(s) is assumed to have data rate, or level of performance, equal to or greater than the associated data rate value.

The term "signal strength limit" refers to an electric field strength that may not be exceeded, to mitigate the effects of interference between different radio networks in different geographic areas. The signal strength limit may be defined by a regulatory agency, such as the FCC. An FCC signal strength limit must be complied with at a geographical border of a licensed area. The FCC has designated certain types of licensed area borders to eliminate interference between users, examples of which include major trading areas (MTAs) basic trading areas (BTAs), cellular market areas (CMAs), etc. The FCC signal strength limits are typically much lower than the usable signal strength required by a radio receiver for useful operation.

To ensure compliance with FCC signal strength limits and avoid interference between users, a "buffer zone" (or "buffer area") around a specified usage area may be defined. The buffer zone may be determined by the techniques described below and forms part of the determination of the above-mentioned geographic boundary. This buffer zone may be defined by a signal strength contour having an associated signal strength limit, which may be the same as or different than an applicable FCC signal strength limit. Thus, the signal strength limit may be specified by default, by a human operator, by a calculated parameter, or in accordance with the applicable agency (e.g., FCC) boundary (e.g., associated MTA, BTA, CMA etc.). In this manner, spectrum may be disaggregated from a larger licensed area and used for the proposed network, but the disaggregated spectrum may be used in an highly efficient manner. The signal strength limits applied in the disclosed techniques may be specified in decibel-microvolts per meter (dbµV/m) and may be calculated as a distance from a base station and/or coverage area using a path loss model.

To establish an effective buffer zone, knowledge regarding relationships between usable data rates (data rate contours) and regulatory limits (signal strength contours) may be used. In one embodiment, contour parameters may be generated and graphically displayed. In addition, efficiency of use may be calculated using different path loss models. Efficiency may be expressed as the usable area inside a specified performance contour divided by total area. And total area may be expressed as the usable area inside a specified performance contour plus the buffer area. Further, the buffer area may be expressed as the area inside a regulatory compliance contour minus the usable area inside a specified performance contour. Efficiency is a figure of merit that defines how well spectrum is used in a corresponding geographic area.

B. System Architecture

With reference to FIG. 1, illustrated is a schematic block diagram of a computer-based system 10 capable of executing computer applications (e.g., software programs). The system 10 may include a computer 12. The computer 12 may be configured to execute a network builder tool 14 and to store a database 16 that contains data regarding network equipment and related information that is used by the network builder tool 14.

In one embodiment, the network builder tool 14 is embodied as one or more computer programs (e.g., one or more software applications including compilations of executable code). The computer program(s) and/or database 16 may be stored on a machine (e.g., computer) readable medium, such as a magnetic, optical or electronic storage device (e.g., hard disk, optical disk, flash memory, etc.).

To execute the tool 14, the computer 12 may include one or more processors 18 used to execute instructions that carry out a specified logic routine(s). In addition, the computer 12 may have a memory 20 for storing data, logic routine instructions, computer programs, files, operating system instructions, and the like. As illustrated, the tool 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The computer 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the computer system 10 to send and receive data signals, voice signals, video signals, and the like to and from other computing devices via an external network 34 (e.g., the Internet, a wide area network (WAN), a local area network (LAN), direct data link, or similar systems). The interface between the computer 12 and any operatively interfaced device or network may be wired or wireless.

The memory 20 may store an operating system 36 that is executed by the processor 18 to control the allocation and usage of resources in the computer 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the tool 14, depend as is generally known by those with ordinary skill in the art. The operating system 36 also may control much of the user interface environment presented to a user, such as features of the overall graphical user interface (GUI) for the computer 12.

Using the computer 12, a user (e.g., a human operator serving as the network developer) may use the tool 14 to carry out the functions described herein. In other embodiments, the computer 12 may be configured as a server that executes the tool 14 to host the functions for another computer, such as a client computer system 38. The client computer system 38 may have a similar architecture to the computer 12. For instance, the client computer system 38 may include a processor configured to execute software containing logical instructions that embody the functions of the client 38 and a memory to store such software and related data. For example, the client computer system 38 may execute a browser 40 to access and interface with tool 14 over the network 34 and the tool 14 may be hosted by the computer 12 in the form of an Internet-style website. In this case, the human operator that serves as the network developer may be remotely located from the computer 12.

It will be apparent to a person having ordinary skill in the art of computer programming, and specifically in application programming for data collection, data processing and/or expert systems, how to program the computer system 10 to operate and carry out logical functions associated with the tool 14 and database 16. Accordingly, details as to specific programming code and database structures have been left out for the sake of brevity. Also, while the tool 14 is executed by a general purpose computing device in accordance with a preferred embodiment, such functionality could also be carried out via dedicated hardware, firmware, software, or combinations thereof.

C. Network Planning

With additional reference to FIG. 2, illustrated are logical operations to implement an exemplary method of planning a wireless network. The exemplary method may be carried out by executing an embodiment of the network builder tool 14, for example. Thus, the flow chart of FIG. 2 may be thought of as depicting steps of a method carried out by the computer system 12. Although FIG. 2 shows a specific order of executing functional logic blocks, the order of executing the blocks may be changed relative to the order shown. Also, two or more blocks shown in succession may be executed concurrently or with partial concurrence.

As indicated, the logical operations may result in the identification of one or more potential equipment solutions for a proposed network, a topology of network base stations and an identifiable geographic boundary that may be used in the acquisition or allocation of spectrum for the network. Also, the equipment solutions may be evaluated to ascertain potential capital expenditures to deploy the network and operating expenditures to run the network. To accomplish the generation of this information, the network builder tool 14 may rely on solution engines that use predictive algorithms and queries of the database 16 to identify appropriate equipment.

C(1). Data Collection

The method may begin in block 42 where information about the proposed network are input by the network developer and received by the computer system 12. For instance, the data that is input may include one or more of a number of network users, a desired throughput (e.g., as specified by a data rate in bits per second (bps) or another format), a coverage area, a location, an application (e.g., type of service to be provided by the network such as voice communications, data communications, video service, etc.), a desired operating frequency, and so forth. As will be described in greater detail, the network builder tool 14 uses the information that is input by the network developer to determine various metrics and formulate equipment suggestions based on queries of the database 16. Therefore, the database 16 may include a knowledge-base of the operating parameters of radio and network equipment as specified by original equipment manufacturers (OEMs) and/or other information sources.

As indicated, aspects of the systems and methods will be described in the exemplary context of planning an IEEE 802.16 WiMAX compliant network. In this exemplary context, categories of information that may be input include, but are not limited to, the following. A typical data entry page may be used to collect the information, such a page with fill-in text boxes, drop down menus, selection buttons or boxes, etc. The user may be able to select from a list of common values for many of the input values. Also, default values may be predetermined. In many instances, the network developer may change the default value. In one embodiment, the default values may be predetermined to identify network equipment solutions that should deliver typically expected performance (e.g., throughput) for the type of network and number of users. Explanation may be provided for the various categories of information along with a description on the typical effect on cost and performance should the user change a default value. Also, the tool 14 may recognize if user specified input for one input category conflicts with user specified input for another input category. In this case, an error message and/or suggestions on correcting the conflict may be presented to the user.

Following the example of an IEEE 802.16 WiMAX compliant network, one input category may be application type, having sub-choices such as fixed and mobile. Also, the user may be prompted to enter information for one or more service types, such as data, voice and video. The tool 14 may determine total network performance information by summing performance data that is individually determined for each service type.

For the data service type, the user may enter a total number of users and a desired throughput per user. The desired throughput per user may be specified as a minimum desired data rate (e.g., in kilobits per second, or kbps) and a desired peak data rate.

For the voice service type, the user may enter a number of peak simultaneous voice over Internet protocol (VoIP) calls and a codec that is expected to be used for the calls. From this information, bandwidth to support the calls may be determined using Equation 1.

$$\text{Bandwidth} = (\text{Number of calls}) \times (1.001^{Number\ of\ calls}) \times \text{Codec bandwidth} \qquad \text{Eq. 1}$$

The codec bandwidth may be determined from a look-up table stored by the database 16. Table 1 shows codec bandwidth for three exemplary audio codecs. An exemplary default may be audio codec G723 with a bandwidth and system overhead of 20 kbps.

TABLE 1

| Audio Codec Type | Bandwidth & System Overhead (kbps) |
|---|---|
| G711 | 80 |
| G723 | 20 |
| G729 | 20 |

For the video application type, the user may enter a number of video streams for each combination of image size, frame rate and codec. Using these parameters, bandwidth to support the specified video may be determined from a look-up table and related calculations to multiply the number of video streams for each combination of image size, frame rate and codec. Table 2 shows bandwidth for various exemplary combinations of image size, frame rate and codec. An exemplary default may be 357 kbps, which corresponds to a video image size of 640×480, a frame rate of five frames per second (fps) and a codec of MPEG-4.

TABLE 2

| Video Image Size and Frame Rate | RAW (kbps) | MPEG-4 (kbps) | MJPEG (kbps) |
|---|---|---|---|
| 320 × 240, 1 fps | 1808 | 25 | 100 |
| 320 × 240, 5 fps | 9040 | 123 | 490 |
| 320 × 240, 15 fps | 27120 | 368 | 1470 |
| 320 × 240, 30 fps | 54240 | 737 | 2950 |
| 640 × 480, 1 fps | 6160 | 72 | 290 |
| 640 × 480, 5 fps | 30800 | 357 | 1430 |
| 640 × 480, 15 fps | 92400 | 1075 | 4300 |
| 640 × 480, 30 fps | 184800 | 2150 | 8600 |

The network developer also may specify a coverage area. Coverage area may be specified in any appropriate manner, such as selection from a predetermined coverage area using, for example, an FCC defined area (e.g., MTA, BTA, CMA, etc.), a zip code, city boarders, county boarders, state boarders, etc. A map of the specified area may be displayed.

As another option, coverage area may be specified so as to correspond to a desired area. In this case, the network developer may specify the coverage area using manual entry of geographic information, such as geographic information system (GIS) map coordinates, longitude and latitude coordinates, world geodetic system (WGS) coordinates, etc. For outdoor applications, a scale in square kilometers ($km^2$) or other measure may be used and, for indoor applications, a scale in square feet ($ft^2$) or other measure may be used.

Figure 3:
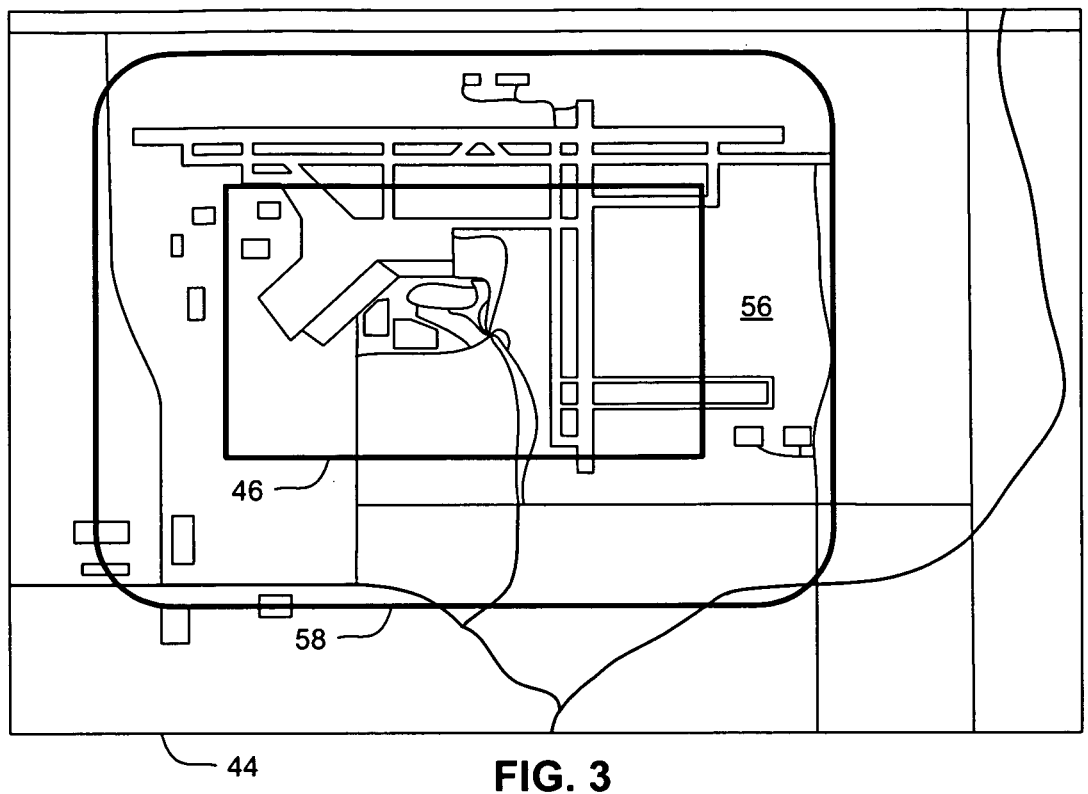
FIG. 3 is an exemplary map-based graphical user interface generated by the system of FIG. 1.

As another option, and with additional reference to FIG. 3, the coverage area may be specified using a graphical, map-based interface. The user may initially find a desired location on an interactive map 44 by specifying a street address, a zip code, GIS coordinates, longitude and latitude coordinates, or the like. Then, the user may cause the display of a desired geographic region by using features such as zooming of the map 44, panning of the map 44, rotating the map 44, etc. Also, while the exemplary maps shown in the appended figures are aerial views, the maps may be perspective views.

Once a geographic region of interest is displayed, the network developer may specify an area that he or she would like the network to cover, referred to as a coverage area 46. The coverage area 46 may be specified using coordinates (e.g., GIS coordinates, longitude and latitude coordinates, WGS coordinates, etc.) or entered using a graphic interface, such as by using a drawing tool to draw on the map 44. The drawing tool may be responsive to user input, such as manipulation of a mouse, touch screen, keyboard command, etc. While the exemplary coverage area 46 is shown as a rectangle, it will be appreciated that the coverage area may be any shape and/or may be discontinuous.

In the illustrated example, the coverage area 46 corresponds to a portion of an airport complex. The exemplary coverage area 46 overlaps a terminal building, parking facilities, a tarmac, portions of taxiways, portions or runways, outbuildings, service roadways, etc. As illustrated, offsite roads, offsite buildings, some outbuildings, other portions of taxiways, other portions of runways, other portions of service roadways, etc. are not within the coverage area 46.

The network developer may further specify whether the base stations will be deployed inside one or more structures or outside. Mixed use also may be possible, but for purposes of description, the use may be classified as one of indoor or outdoor. As will be described in greater detail below, indoor network performance metrics and outdoor network performance metrics may be determined in different manners from each other, and such determination may further depend on whether manual arrangement of base stations is employed or whether automated arrangement of base stations is employed.

To facilitate planning and evaluation of network options, the data collection may be limited to (e.g., consist essentially of) collecting data related to identifying network throughput and identifying the coverage area. In this manner, the knowledge level of the network developer need not be very high and, even for highly knowledgeable network developers, network planning maybe simplified and expedited. To this end, other data may be specified by default, such as operating frequency, channel bandwidth, mode, base station capacity, backhaul capacity, etc. In another embodiment, information beyond that to determine network throughput and coverage area may be specified by the network developer and/or default values may be changeable. Therefore, additional categories of data that fit within the exemplary context of a WiMAX network will be briefly described.

Another network design parameter that may be specified is channel bandwidth. For WiMAX, exemplary channel bandwidths choices are 1.75 MHz, 3.5 MHz, 5.0 MHz, 7.0 MHz, 10.0 MHz, and 20.0 MHz. An exemplary default channel bandwidth may be 5.0 MHz. Channel bandwidth is the range of frequencies occupied by a modulated carrier wave. In general, the greater the bandwidth of the assigned channels, the higher the possible speed of data transmission.

Another network design parameter that may be specified is mode, such as frequency division duplex (FDD) (e.g., dual/paired channel) or time divisional duplex (TDD) (e.g., single channel). An exemplary default for communications format is TDD. For WiMAX, these formats are methods of separating WiMAX uplink (UL) and downlink (DL) communication signals. TDD uses a single frequency channel assigned to both the transmitter and the receiver. Both the TDD uplink (UL) and TDD downlink (DL) traffic use the same frequency but at different times. FDD assigns distinct frequencies channel to the transmitter and to the receiver. At any particular instant in time, FDD uplink (UL) traffic uses a frequency that is different from the frequency used by the FDD downlink (DL) traffic. In one embodiment, performance calculations may be determined for all channel bandwidth and FDD/TDD permutations and the results may be presented in a tabular format for the network developer's reference and/or selection of an appropriate combination.

Another network design parameter that may be specified is base station capacity, which for WiMAX may be a base station nominal over the air data rate (indoor/outdoor) value selected from BPSK-1/2, QPSK-1/2, QPSK-3/4, 16-QAM-1/2, 16-QAM-3/4, 64-QAM-2/3, or 64QAM-3/4. An exemplary default for base station capacity may be 16-QAM-3/4. Using this parameter, estimated throughput as a function of data rate, channel bandwidth and mode may be extracted using a lookup table. FIG. 4 is an exemplary lookup table for this purpose and was derived from Andrews et al., "Fundamentals of WiMAX," Prentice Hall, New Jersey, 2007. The lookup table of FIG. 4 assumes a frame size of 5 millisecond (ms), a 12.5 percent orthogonal frequency-division multiplexing (OFDM) guard interval overhead, and a partial usage of sub-channels (PUSC) subcarrier permutation scheme.

Another network design parameter that may be specified is base station backhaul capacity, which for a WiMAX network may be selected from T1 (about 1.5 Mbps), DSL (about 3.0 Mbps), cable modem (about 6.0 Mbps), DS3 (about 45 Mbps), OC3 (about 55 Mbps), 10 BaseT (about 10 Mbps), or other user specified configuration. A warning may be generated is if base station backhaul capacity is less than the throughput associated with a nominal base station over the air data rate as determined from the lookup table of FIG. 4.

C(2). Equipment Matching

With continued reference to FIG. 2, the logical flow may proceed in block 48. In block 48, the tool 14 may identify base station equipment that is capable of implementing the criteria entered by the network developer and/or selected by default. In one embodiment, the database 16 may be populated with data regarding commercially available OEM base station radios and related devices. Parsing logic may be used to filter the database of all possible equipment down to one or more sets of equipment that satisfy the criteria. Each matching equipment set may have an associated manufacturer and equipment model number (or equipment family).

Data fields for the database 16 may include one or more of manufacturer, equipment model identifier, equipment family identifier, equipment type (e.g., base station, subscriber device, etc.), supported mode (e.g., FDD, TDD, HFDD, etc.), supported version (e.g., for WiMAX, 802.16d (fixed) or 802.16e (mobile), supported channel bandwidth (e.g., 1.75 MHz, 3.5 MHz, 5.0 MHz, 7.0 MHz, 10.0 MHz, 20.0 MHz), operating frequency range (in MHz), effective isotropic radiated power (EIRP), transmit (TX) power, antenna gain, equipment cost, etc. Using the stored information, database parsing and equipment selection logic may be used to identify which equipment matches the previously collected and/or determined parameters.

C(3). Determine Network Performance Metrics

In block 50, an analysis may be undertaken to determine network performance metrics for a matched base stations from block 48. Also, an estimation of the number of the base stations to service the coverage area 46 may be determined. The base station estimate may be expressed as a total number of base stations, and/or a number of base stations per unit area (e.g., square mile). The analysis of block 50 may be iterated for all matched equipment solutions or for matched equipment solutions that are selected by the network developer. The analysis of block 50 may be made based on one or more operating frequencies that are selected by the network developer. If operating frequency is not known (e.g., since spectrum for the network may be obtained through an exchange in which frequency is a variable), then the analysis of block 50 may be carried out for a default frequency or plural default frequencies.

The determinations of block 50 may be made in different manners, depending on whether the network is specified as an indoor network or an outdoor network. In general, indoor network performance metrics may be determined as a function of capacity and outdoor network performance metrics may be determined as a function of throughput at a specified range (e.g., 3,000 kbps at 5 km).

In one embodiment, the network developer may be given the option to have the tool 14 place the base stations or to manually place the base stations. In this case, the determinations of block 50 may be made in accordance with the selected option for automated placement or manual placement of base stations.

C(3)(a). Indoor Analysis—Automated or Manual Base Station Placement

For automated or manual placement of base stations for an indoor network, available base station capacity may be used to estimate network equipment quantities. The base station throughput may be based on the lesser of available backhaul or an available over the air data throughput. It is recognized that indoor environments vary significantly with the structure in which the network is to be deployed. As such, data rate versus range predictions may be speculative unless a detailed building model used. Information to construct a building model may not be known to the network developer or may be inaccurate. For these reasons and to reduce computational complexity, the following approaches do not make assumptions about range, but do assume a maximum available EIRP. In other embodiments, building models may be used to make range determinations and/or range assumptions may be used.

In the exemplary approach, a total network throughput in kbps may be determined by summing total data throughput, total video throughput and total VoIP throughput as derived from the data input in block 42 and described in greater detail above. Next, a throughput density in (e.g., in kbps/ft$^2$) may be determined. Throughput may be determined by dividing total network throughput by the size of the coverage area.

Next, base station capacity (in kbps) may be determined. Base station capacity may be the available backhaul capacity or the anticipated average over the air throughput, whichever is less. As indicated, expected data throughput may be a function of mode, bandwidth and data rate. In one embodiment, the expected data throughput may be extracted from a lookup table, such as the lookup table of FIG. 4.

Next, an estimated total number of base stations may be determined by dividing the total network throughput (expressed in kbps) by base station capacity (expressed in kbps).

C(3)(b). Outdoor Analysis—Automated Base Station Placement

For automated placement of base stations for an outdoor network, the focus may be placed on throughput at a specified range. In the exemplary approach, a total network throughput in kbps may be determined by summing total data throughput, total video throughput and total VoIP throughput as derived from the data input in block 42 and described in greater detail above. Next, a throughput density in (e.g., in kbps/km$^2$) may be determined. Throughput density may be determined by dividing total network throughput by the size of the coverage area.

Next, a base station cell radius may be determined. The base station cell radius may be expressed as data rate contour radii for a base station nominal over the air data rate that is selected by user. Data rate contour radii for each data rate may be derived as follows, using an allowed path loss model where allowed path loss is equal to EIRP plus receiver (RX) antenna gain minus power needed at the receiver. Power needed at the receiver may be expressed in accordance with Equation 2, where K is 1.38E-23 Watts/° K/Hz, T is 300° K., B is channel bandwidth in Hz, NF is a noise figure of 7 db as specified by IEEE 802.16e, IL is an implementation loss of 5 db as specified by IEEE 802.16e, RX signal to noise ratio (SNR) is determined by Table 3 which contains RX SNR specified by IEEE 802.16e, and UM is a user margin of about 3 db. Equation 2 may be solved for every set of modulation, coding rate and BW combinations, if appropriate. Also, it may be assumed that RX antenna gain is about 10 dbi.

$$\text{Power Needed at } RX = [10*\log(KTB) + NF + IL + RX\ SNR + UM]  \quad \text{Eq. 2}$$

TABLE 3

| Modulation | Coding Rate | RX SNR (db) |
|---|---|---|
| BPSK | ½ | 3 |
| QPSK | ½ | 6 |
| QPSK | ¾ | 8.5 |
| 16-QAM | ½ | 11.5 |
| 16-QAM | ¾ | 15 |
| 64-QAM | ⅔ | 19 |
| 64-QAM | ¾ | 21 |

Thus, allowed path loss may be expressed as set forth in Equation 3, where N is a path loss coefficient that is specified by the user or by default, and d is the contour radii. An exemplary value for N is 2.4.

$$\text{Path Loss} = 10*N*\text{LOG10}\left[\frac{(4*\pi*d)}{\text{wavelength}}\right] \quad \text{Eq. 3}$$

Further, base station cell radius (contour radii measured in meters) may be expressed as set forth in Equation 4, where wavelength may be 3e8/frequency (Hz), for example.

$$\text{Contour Radii} = \frac{\left(10^{\frac{\text{Path Loss}}{10*N}} * \text{wavelength}\right)}{(4*\pi)} \quad \text{Eq. 4}$$

Following determination of the base station cell radius, an estimate of the total number of base stations for the network may be determined using Equation 5, where an exemplary value for the overlap factor N is 1.21 for overlapping circles in a hexagonal grid pattern.

$$\text{Estimated Base Station Number} = \frac{N \times \text{Total Coverage Area}}{\pi \times (\text{Data Rate Contour Radii})^2} \quad \text{Eq. 5}$$

Next, the available network throughput (expressed in kbps) may be determined by multiplying the estimated total number of base stations from Equation 5 by the throughput per base station as derived from the lookup table of FIG. 5. If the available network throughput is greater or equal to the total network throughput, then the base station cell radius from equation 4 may be used as an output value and the estimated total number of base stations from Equation 5 may be used as an output value.

But if the available network throughput is less than the total network throughput, then a revised estimated total number of base stations may be determined by dividing the total network throughput by the base station capacity. Using the revised estimated total number of base stations, a revised base station cell radius may be calculated in accordance with Equation 6. In this case, the revised estimated total number of base stations and the revised base station cell radius may be used as output values.

$$\text{Revised Base Station Cell Radius} = \sqrt{\frac{N \times \text{Total Coverage Area}}{\pi \times \text{Revised Estimated Number}}} \quad \text{Eq. 6}$$

C(3)(c). Outdoor Analysis—Manual Base Station Placement

For manual placement of base stations for an outdoor network, an estimate of the number of base stations may be determined using a base station throughput approach or a base station cell radius approach. The base station throughput approach assumes maximum base station EIRP and uses the base station data rate specified by the network developer or the default value. The base station data rate is based on available backhaul or an assumed over the air data rate. The base station cell radius uses a base station cell radius, and derives the EIRP and data rate required to meet the user requirements.

C(3)(c)(i). Base Station Throughput Approach

In the exemplary approach of using base station throughput, a total network throughput in kbps may be determined by summing total data throughput, total video throughput and total VoIP throughput as derived from the data input in block 42 and described in greater detail above. Next, a total throughput density in (e.g., in kbps/km²) may be determined. Total throughput density may be determined by dividing total network throughput by the size of the coverage area.

Next, an estimated total number of base stations may be determined by dividing total network throughput by base station data rate. The estimated total number of base stations may be used as an output value.

Also, base station cell radius that may be used as an output value may be determined in accordance with Equation 7, where the overlap factor N may be 1.21 for overlapping circles in a hexagonal grid pattern.

$$\text{Base Station Cell Radius} = \sqrt{\frac{N \times \text{Total Coverage Area}}{\pi \times \text{Estimated Base Station No.}}} \quad \text{Eq. 7}$$

Next, base station EIRP (dbm) may be determined as a function of base station cell radius, base station data rate, and channel bandwidth. For instance, EIRP is equal to power needed at the receiver minus RX antenna gain plus path loss. A solution for EIRP may be determined using Equations 2 and 3 as described above, but with a user margin (UM) of 6 dB and an assumed RX antenna gain of about 10 dbi, for example.

Also, a base station minimum data rate (expressed in kbps) may be determined. Base station minimum data rate, also referred to as base station capacity, may be a function of mode, bandwidth and data rate. In one embodiment, the base station minimum data rate may be extracted from a lookup table, such as the lookup table of FIG. 4.

C(3)(c)(ii). Base Station Cell Radius Approach

In the exemplary approach of using base station cell radius, a total network throughput in kbps may be determined by summing total data throughput, total video throughput and total VoIP throughput as derived from the data input in block 42 and described in greater detail above. Next, total throughput density in (e.g., in kbps/km$^2$) may be determined. Total throughput density may be determined by dividing total network throughput by the size of the coverage area.

Then, base station throughput (expressed in kbps) may be determined by multiplying the total throughput density by pi ($\pi$) and by the square of a minimum base station cell radius. The minimum base station cell radius may be a predetermined value that is set by default or as modified by the network developer.

Also, a base station minimum data rate (expressed in kbps) may be determined. Base station minimum data rate, also referred to as base station capacity, may be a function of mode, bandwidth and data rate. In one embodiment, the base station minimum data rate may be extracted from a lookup table, such as the lookup table of FIG. 4.

Next, base station EIRP (dbm) may be determined as a function of base station cell radius, base station data rate, and channel bandwidth. For instance, EIRP is equal to power needed at the receiver minus RX antenna gain plus path loss. A solution for EIRP may be determined using Equations 2 and 3 as described above, but with a user margin (UM) of 6 dB and an assumed RX antenna gain of about 10 dbi, for example.

An estimated total number of base stations that may be used as an output value may be determined in accordance with Equation 8, where an exemplary value for the overlap factor N is 1.21 for overlapping circles in a hexagonal grid pattern.

$$\text{Estimated Base Station Number} = \frac{N \times \text{Total Coverage Area}}{\pi \times (\text{minimum cell Radius})^2} \qquad \text{Eq. 8}$$

D. Data Evaluation

With continued reference to FIG. 2, the logical flow may proceed in block 52. In block 52, various data items may be reported to the network developer for evaluation and possible further narrowing of the equipment options that match the input criteria. In one embodiment, a list or table of the equipment matches that may be used to deploy the proposed network may be displayed. Each match may be identified by manufacturer and model number (or equipment family). For each equipment solution, various additional information items may be provided, such as total network throughput, throughput density and the estimated total number of base stations for the specific equipment associated with the solution. If this information is determined for plural frequencies, the information may be presented for each combination of equipment solution and potential operating frequency.

Additional information also may be provided, particularly in the case where manual placement of base stations may be made. The additional information may include base station throughput, base station minimum data rate, determined base station EIRP, base station capable EIRP from data provided by the OEM or other source, etc.

Comparisons to other technologies also may be made. For instance, in the example of WiMAX, an estimate of the total number of WiFi devices to cover the same area may be determined using techniques similar to those described above and presented to the network designer. It will be understood that WiFi solutions tend to use about 20 MHz of spectrum in a potentially congested, unlicensed band. These factors may lead to a limited quality of service (QoS) under WiFi. For IEEE 802.11g (2.4 GHz), and estimated total number of base stations may equal 1.21×total coverage area (km$^2$)/[$\pi$× (802.11g data rate contour radii)$^2$]. For IEEE 802.11a (5.8 GHz), and estimated total number of base stations may equal 1.21×total coverage area (km$^2$)/[$\pi$×(802.11a data rate contour radii)$^2$]. Exemplary 802.11g data rate contour radii and 802.11a data rate contour radii may be derived from a look-up table, such as the exemplary look-up table of FIG. 5. Also, these calculations may be made using the WiFi data rate that corresponds to the base station nominal over the air data rate (e.g., WiMAX 64-QAM-3/4 is comparable to WiFi 16-QAM 36 mbps).

Additional information may be presented or added by the network developer. For example, capital expenditure estimates to purchase and/or install all or selected equipment solution may be presented or added by the network developer. These valves may be presented as total valves (e.g., in U.S. dollars, Euros, etc.) or an another indicator, such as money valve per hertz per unit area or money valve per hertz per capita. Also, operating expenditure estimates to operate all or selected equipment solution and, if applicable, each frequency may be presented or added by the network developer. These valves may be specified for a time period (e.g., one year or five years) and/or may be stated on a per hertz, per unit area, and/or per capita basis.

In one embodiment, if the network developer is planning to acquire spectrum from a spectrum exchange to operate the network, historical and/or estimated pricing for appropriate spectrum may be available from the exchange or associated broker and this pricing information may be used in the determination of capital and/or operating expenditure estimates. The capital and operating expenditure information may further aid the network developer in selecting an appropriate equipment solution from the solutions that meet the criteria for the proposed network. The network developer may be able to discover, for example, that more expensive radio devices may be cheaper to operate over the long term than less expensive radio devices.

E. Network Design

With continued reference to FIGS. 2 and 3, the logical flow may proceed in block 54. In block 54, and for a selected one of the equipment solutions (or plural equipment solutions, if the network developer so choices), the tool 14 may assist the network developer in determining where base stations may be placed to provide network service for the coverage area 46. Also, the tool 14 may generate a buffer zone 56 around the coverage area to define an area that may be used to comply with FCC signal strength limits, mitigate potential interference with other networks and make efficient use of spectrum availability. The buffer zone 56, which may be defined by a signal strength contour 58, further may be used to define a geographic area that is used in the acquisition of spectrum use rights from a spectrum exchange, for example.

E(1). Automated Base Station Placement

In the embodiment where the tool 14 automatically places base stations to service the coverage area 46, the tool 14 may use an expert system and heuristic techniques to determine where the base stations should be placed. The tool 14 may use all collected and determined information in this process, including the shape of the coverage area 46. Other information may be used in the process, such as antenna height (HAAT), terrain data, results from alternative path loss models (e.g., an Longley Rice propagation model), appropriate FCC signal strength limit values for the location in which the geographic area 46 is present, etc.

Following placement of the base stations, the buffer zone 56 may be determined. A signal strength limit value that will be used to establish the buffer zone 56 may be specified in dbμ V/m and calculated as a distance from a base station or coverage area 46 using a path loss model. The signal strength limit may be established by default or by the network developer. A default signal strength limit value may be predetermined to establish a buffer zone that achieves efficient use of spectrum as described above and that may maximize spectrum use allocation through a spectrum exchange. Other signal strength limit values may be determined by a holder of the spectrum that may be used by the network, or in accordance with the GSA boundary for the applicable FCC Part.

The determination of the buffer zone 56 may start with determination of an FCC signal strength limit contour, which may be determined as follows. First, Equations 9 through 13 are assumed. Equation 10 is for the contour or GSA boundary and is typically specified in dbW/m² or converted from V/m². For Equation 12, n equals 1.0, aperture area is assumed to be 1 m² and corresponding RX antenna gain (as a function of wavelength) is capable of being calculated.

$$EIRP(\text{dbm}) - \text{Path Loss (db)} + RX \text{ Antenna Gain (db)} = \qquad \text{Eq. 9}$$
$$RX \text{ Power (dbm)}$$

$$RX \text{ Power (db)} = \frac{E^2}{(120 \times \pi)} \times \text{Aperture Area} \qquad \text{Eq. 10}$$

$$\text{Path Loss (db)} = 10 \times N \times \text{LOG10}\left[\frac{(4 \times \pi \times d)}{\text{wavelength}}\right] \qquad \text{Eq. 11}$$

$$\text{Aperture Area (m}^2\text{)} = (n) * \frac{\text{wavelength}^2}{4 * \pi} * RxAntGain \qquad \text{Eq. 12}$$

$$RX \text{ Antenna Gain (db)} = 10 \times \text{LOG10}\left[\frac{\text{Aperture Area} \times 4 \times \pi}{1 \times \text{wavelength}^2}\right] \qquad \text{Eq. 13}$$

Substituting Equations 10 through 13 into Equation 9 (in db) yields Equation 14, where the aperture area equals 1 m².

$$EIRP - \left\{\frac{E^2}{(120 \times \pi) \times \text{Aperture Area}}\right\} + 10 \times \text{LOG10}\left[\frac{\text{Aperture Area} \times 4 \times \pi}{1 \times \text{wavelength}^2}\right] = \qquad \text{Eq. 14}$$

$$10 * \text{LOG10}\left[\frac{E^2}{(120 \times \pi)}\right] \times \text{Aperture Area}$$

From Equation 14, Equation 15 may be derived where N is a path loss coefficient with an exemplary default value of 2.4, E (in volts per meter) is $10E6 \times [10^{E(dB\mu V/m)/20}]$ with an exemplary default value of 47 dBμ V/m, wavelength, has an exemplary default value of 3e8/frequency (Hz), and aperture area is 1 m².

$$\text{Path Loss (db)} = 10 \times N \times \text{LOG10}\left[\frac{(4 \times \pi \times d)}{\text{wavelength}}\right] \qquad \text{Eq. 15}$$

$$= EIRP + \left(10 \times \text{LOG10}\left[\frac{(4 \times \pi)}{\text{wavelength}^2}\right]\right) -$$

-continued $$\left(\frac{E^2}{120 \times \pi}\right)$$

Solving for d, which represents an FCC signal strength limit radius, yields equation 16.

$$d = \left(\frac{\text{wavelength}}{4 \times \pi}\right) \times 10^{\left[\frac{Path\ Loss}{(N^*10)}\right]} \qquad \text{Eq. 16}$$

Noting that a single path loss (PL) model may not adequately predict performance for all environments, the FCC signal strength limit radius may alternatively be determined using other path loss models, such as one or more of free space PL, simple PL, SUI PL, COST-231 Hata PL, ECC-33 PL, Longley Rice, and Egli PL. A result that gives the most conservative FCC signal strength limit radius may be used in the final determination of the buffer zone as described below. In one embodiment, the results of Equation 16 and an Egli propagation model that accounts for base station and subscriber height above ground level (AGL) may be compared to establish the FCC signal strength limit radius. A suitable Egli propagation model is set forth in Equation 17, where A is attenuation in dB (between dipoles), D is path distance in miles, F is the frequency in MHz, $H_T$ is transmitter antenna height AGL in feet, and $H_R$ is the receiver antenna height AGL in feet.

$$A = 117 + 40 \log D_{mile} + 20 \log F - 20 \log(H_T \cdot H_R) \qquad \text{Eq. 17}$$

Referring again to FIG. 3, the buffer zone 56 may be defined as area between the specified coverage area 46 and the signal strength contour 58 that may be determined in one of the following exemplary manners. The buffer zone 56 need not be displayed to the network developer, but the ability to view the a buffer zone 56 with respect to the coverage area 46 may facilitate validating, analyzing and/or optimizing buffer zone selection.

For indoor applications, the signal strength contour 58 may be extended directly outward from the coverage area 46 by the distance calculated in Equation 16, or a distance determined using an alternative path loss model. In one embodiment, an attenuation factor may be used to adjust the distance. For instance, the attenuation factor may be subtracted from EIRP (e.g., in predecessor Equation 15) to account for building construction. An exemplary attenuation factor may be 12 dB.

For outdoor applications, the signal strength contour 58 may be extended directly outward from the coverage area 46 by the distance calculated in Equation 16 minus the base station cell radius. This technique is used under an assumption that the base stations will be set back from a perimeter of the coverage area 46 by the working radius of the base station equipment. Therefore, the technique may be modified if one or more base stations will not be positioned in this manner.

The strength contour 58 may be serve to define a geographic construct that may be used in the development of spectrum identifying components, such as a the above-mentioned time window, frequency-based spectral mask, geography-based emission mask and transmitted power limit. The strength contour 58 may be sufficiently sized to provide adequate coverage for the proposed network and provide FCC compliance. At the same time, the strength contour 58 may be established to efficiently use spectrum resources. For instance, the area within this geographic boundary may be minimized so as to facilitate spectrum use in adjacent locations.

E(2). Manual Base Station Placement

In the embodiment where the network developer selects placement of the base stations, the tool 14 may assist the network developer by initially placing base stations using the techniques described above. For instance, the tool 14 may use analysis to proposed base station locations. Alternatively, the network developer may manually identify initial base station locations.

Figure 6:
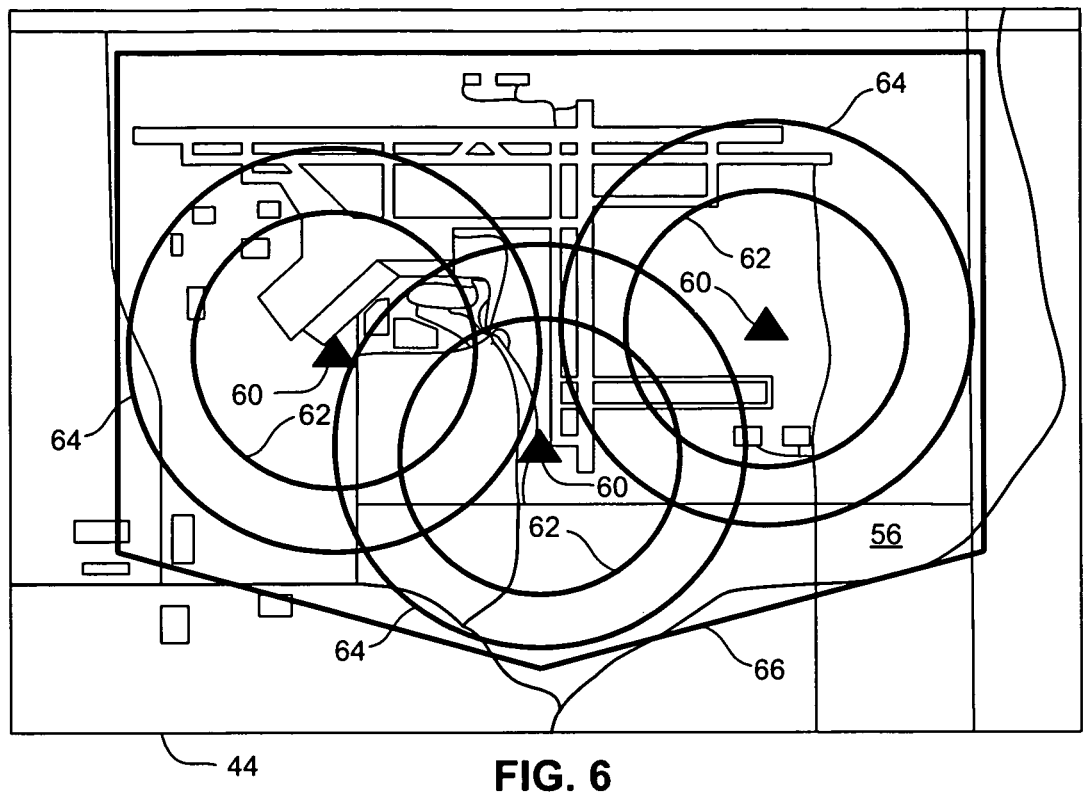
FIG. 6 is another exemplary map-based graphical user interface generated by the system of FIG. 1.

With additional reference to FIG. 6, the placement of base stations 60 may be graphically displayed on the map 44 (e.g., by using GIS imagery). In addition, data rate contours 62 in accordance with the determined data rate contour radii as described above may be shown on the map 44. FCC signal strength contours 64 may be shown on the map 44. A base station 60 may be moved by selecting the base station 60 and dragging it to another location or by specifying new coordinates for the base station 60. If a base station 60 is moved, the associated data rate contour 62 and FCC signal strength contour 64 may be moved accordingly.

The FCC signal strength contour 64 may be generated using a signal strength limit specified in dbµ V/m and a path loss model for free space. The signal strength contours 64 may be displayed as respective radii around each base station 60. The depiction of the signal strength contours 64 may assist the network developer in selecting a geographic area for which spectrum for the proposed network may be acquired through an exchange, for example. For instance, the displayed signal strength contours 64 aid in visualizing a geographic region that yields enough area to attain adequate radio coverage and to maintain FCC compliance. In one embodiment, a default value for emission limits may be 47 dbµ V/m. If appropriate, an adjustment factor (e.g., about 10 db or more) may be added to account for indoor to outdoor transition path loss.

In one embodiment, the calculation for determining the emission limit radii for each base station may be based upon free space propagation in accordance with Equation 18, where an exemplary default value for E is 47 dbµ V/m (or 0.000224 V/m).

$$\frac{EIRP(W)}{(4*\pi*Radii^2)} = \frac{E^2}{120*\pi} \qquad \text{Eq. 18}$$

By rearranging Equation 18, radii values for the signal strength contours 60 may be calculated using Equation 19.

$$Radii = \sqrt{\left(\frac{EIRP \times 30}{E^2}\right)} \qquad \text{Eq. 18}$$

As an exemplary alternative, determination of radii for the FCC signal strength limit contours 64 for a lossy medium may be determined in accordance with the techniques associated with Equations 9 through 16.

In one embodiment, the tool 14 may allow the network developer to draw or otherwise specify a geographic boundary 66. Alternatively, the geographic boundary 66 may be generated by the tool 14 based on an aggregation (e.g., by concatenation) of the compliance contours 64. For instance, the geographic boundary 66 may be constructed as a geometric shape then encloses the aggregate area of the compliance contours 64. The area between the geographic boundary 66 and the aggregate of the data rate contours 62 may be considered a buffer zone 56.

Akin to the signal strength contour 58, the geographic boundary 66 may be serve to define a geographic construct that may be used in the development of spectrum identifying components, such as a the above-mentioned time window, frequency-based spectral mask, geography-based emission mask and transmitted power limit. The geographic boundary 66 may be sufficiently sized to provide adequate coverage for the proposed network and provide FCC compliance. At the same time, the geographic boundary 66 may be established to efficiently use spectrum resources. For instance, the area within the geographic boundary 66 may be minimized so as to facilitate spectrum use in adjacent locations.

In one embodiment, enhancements may be used to allow the network developer to graphically view the effect of variations in base station attributes on radio coverage. This ability may provide the capability to illustrate and plan the acquisition of spectrum use rights for a corresponding geographic footprint. As with the rest of the above-described approaches, the following techniques are described with respect to IEEE 802.16 WiMAX technology. It will be appreciated that these techniques may be modified for use with most or all other radio technologies.

To vary base station attributes, a single base station 56, plural base stations 56 or all base stations 56 may be selected using an input device, such as a keyboard, mouse and/or touch screen. Attributes (e.g., database parameters and calculated parameters) for the selected base station(s) 56 may be displayed in a text box. The network developer may change any attributes that are capable of being changed for the associated equipment solution. If an attribute is changed, the tool 14 will dynamically generate data rate and compliance contours in accordance with the changes. These revised contours also may be displayed on the map 44. Exemplary configurable attributes include, but are not limited to, manufacturer, equipment model, mode (e.g., FDD or TDD), channel bandwidth (e.g., 1.75 MHz, 3.5 MHz, 5.0 MHz, 7.0 MHz, 10.0 MHz or 20.0 MHz), operating frequency range(s), EIRP, receiver antenna gain, path loss coefficient, indoor or outdoor deployment, path loss assumption for an indoor to outdoor transition that, by default, may be about ten or more db, data rate contour radii for indoor deployment, and data rate contour radii for each WiMAX data rate (e.g., any one of the 7 WiMAX data rates may be enabled individually and may be associated with the display of a corresponding data rate contour 62 around the appropriate base station).

Additional configurable attributes may include the path loss model that is used (e.g., simple path loss model with a path loss coefficient or an Egli model), antenna height (HAAT), application (e.g., WiMAX or other network type), etc. In one embodiment, the network developer may be able to eliminate an attribute, such a manufacturer, mode, channel bandwidth, data rate selection, etc. In another embodiment, the network developer may be able to add an attribute.

F. Conclusion

The disclosed systems and methods allow a network developer to identify radio equipment that may be used to deploy a proposed network. Also, the disclosed systems and methods may identify a geographic extent for the proposed network using geo-fencing techniques, even when the network developer may not know what frequency the network may operate under. The geographic extent may be a signal strength contour or boundary used to define a buffer zone. This allows the network developer to pursue spectrum to accommodate the proposed network. Also, the total size of the geographic extent may be constrained for efficient spectrum allocation. As described above, the constraints are established by basing geographic extent on network specific criteria, such as aggregated compliance contours for individual base stations or circumscribing distance from a geographic coverage area.

Further, the geographic extent may continued to be applicable in situations where user rights in spectrum may be temporary in duration and the network developer may seek spectrum at another frequency to support the network in the future. Alternatively, the geographic extent may be redetermined if the frequency changes. The systems and methods also may provide the network developer with a sense of the complexity of the proposed network and of potential costs involved, including capital expenditures and operating expenditures.

The disclosed techniques do not use preconceived notions relating to network design. For instance, there is no starting point with a relationship to specific radio technology (e.g., by manufacturer or model) and/or there is no starting point with a relationship to specific spectrum parameters. While these categories of network criteria may be specified, the systems and methods apply to network development without knowledge of specific equipment, specific manufacturer or specific frequency parameters. In one embodiment, however, existing or otherwise predetermined network equipment may be used as an input and the tool 14 may be used primarily for purposes other than equipment evaluation, such as geographic boundary determination.

Although certain embodiments have been shown and described, it is understood that equivalents and modifications falling within the scope of the appended claims will occur to others who are skilled in the art upon the reading and understanding of this specification.

What is claimed is:

1. A computer implemented method of identifying equipment for a proposed wireless network, comprising:
    receiving wireless network criteria from a network developer, the wireless network criteria identifying a geographic coverage area with respect to a map and identifying projected usage information for determining network throughput, wherein a network operating frequency of the proposed wireless network is subject to change over time in accordance with durations of temporary spectrum use rights that are acquired to operate the proposed wireless network;
    identifying one or more base station devices by equipment model identifier that are capable of implementing the wireless network criteria from a database of wireless network equipment that contains data for base station devices available from plural equipment manufacturers, wherein the identification of base station devices by equipment model identifiers is made without specification of network operating frequency by the network developer; and
    for each identified base station equipment model identifier, identifying an estimated number of base station devices to satisfy the wireless network criteria.

2. The method of claim 1, further comprising, for at least one of the base station equipment model identifier, identifying a geographic extent for the proposed wireless network, the geographic extent sized to comply with regulatory agency signal strength limits.

3. The method of claim 2, wherein the geographic extent defines geographic data that is used to generate spectrum identifying components of a request for spectrum use rights from a spectrum exchange through which spectrum to support the proposed wireless network is acquired.

4. The method of claim 2, wherein the geographic extent is the geographic coverage area combined with a buffer area, the buffer area defined by circumscribing the geographic coverage area by a distance extending outward from all points of a perimeter of the geographic coverage area.

5. The method of claim 4, wherein a manner in which the distance is determined is based on whether the base stations of the proposed wireless network will be deployed inside or outside one or more buildings.

6. The method of claim 4, wherein the distance is determined using a path loss model.

7. The method of claim 2, wherein the geographic extent is a boundary that is established around and encompassing a regulatory agency compliance contour for each base station.

8. The method of claim 2, wherein the method further comprises varying a base station attribute and determining a corresponding change to the geographic extent for the proposed wireless network.

9. The method of claim 1, further comprising, for at least one of the identified base station equipment model identifiers, determining an arrangement of base station device locations to satisfy the wireless network criteria.

10. The method of claim 9, further comprising displaying the map and base station device locations relative to the coverage area.

11. The method of claim 9, further comprising displaying the map and at least one of a regulatory agency compliance contour or a data rate contour for each base station.

12. The method of claim 1, further comprising outputting each identified base station equipment model identifier and estimated number of base station devices to the network developer in a format for evaluation of network feasibility and cost in terms of estimated capital expenditure and operating expenditure for each identified base station equipment model identifier.

13. A computer implemented method of complying with regulatory agency signal strength limits for a proposed wireless network, comprising:
    receiving wireless network criteria from a network developer, the wireless network criteria identifying a geographic coverage area with respect to a map and identifying projected usage information for determining network throughput;
    determining an estimated number of base stations to satisfy the wireless network criteria and achieve the network throughput for the geographic coverage area; and
    determining a signal strength compliance contour for the proposed wireless network, the signal strength compliance contour defining a boundary at which the proposed wireless network complies with regulatory agency signal strength limits.

14. The method of claim 13, wherein the identification of the estimated number of base stations is made without specification of network operating frequency by the network developer.

15. The method of claim 13, wherein the signal strength compliance contour defines geographic data that is used to generate spectrum identifying components of a request for spectrum use rights from a spectrum exchange through which spectrum to support the proposed wireless network is acquired.

16. The method of claim 13, wherein the signal strength compliance contour is the geographic coverage area combined with a buffer area, the buffer area defined by circumscribing the geographic coverage area by a distance extending outward from all points of a perimeter of the geographic coverage area.

17. The method of claim 16, wherein a manner in which the distance is determined is based on whether the base stations of the proposed wireless network will be deployed inside or outside one or more buildings.

18. The method of claim 16, wherein the distance is determined using a path loss model.

19. The method of claim 13, wherein the signal strength compliance contour is a boundary that is established around and encompassing a regulatory agency compliance contour for each base station.

20. The method of claim 13, further comprising determining an arrangement of base station locations to satisfy the wireless network criteria.

21. The method of claim 20, further comprising displaying the map and base station locations relative to the coverage area.

22. The method of claim 20, further comprising displaying the map and at least one of a compliance contour or a data rate contour for each base station.

23. The method of claim 20, further comprising redetermining the signal strength compliance contour in response to rearrangement of the base station locations by the network developer.

24. The method of claim 13, wherein the signal strength compliance contour defines a geographic construct that establishes an area for which access permission to spectrum to support operation of the proposed wireless network is to be obtained.

25. The method of claim 24, wherein the method further comprises varying a base station attribute and determining a corresponding change to the signal strength compliance contour.

26. The method of claim 13, wherein a network operating frequency of the proposed wireless network is subject to change over time in accordance with durations of temporary spectrum use rights that are acquired to operate the proposed wireless network.

27. The method of claim 26, wherein the signal strength compliance contour defines a geographic construct that establishes an area for which each temporary use right to support operation of the proposed wireless network is to be obtained.

28. The method of claim 13, wherein the signal strength compliance contour is offset from and surrounds the geographic coverage area by a buffer area.

* * * * *